R. P. WHITE.
BAIL EAR FOR VESSELS.
APPLICATION FILED MAR. 18, 1918.
1,285,860. Patented Nov. 26, 1918.
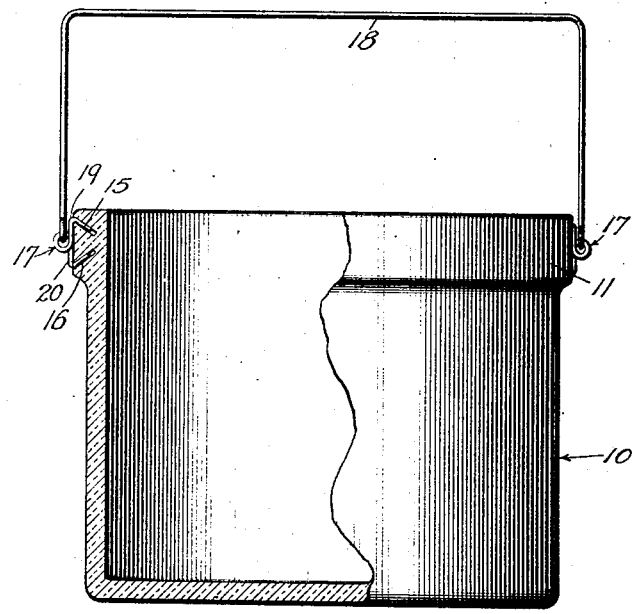
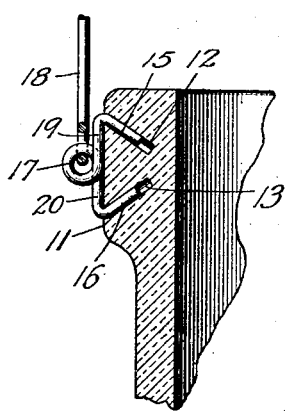
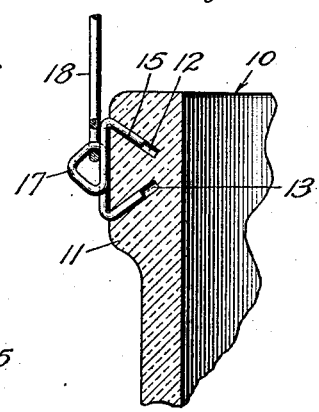
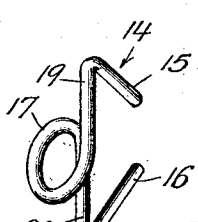
Witnesses:
Robert H. Weir
Arthur W. Carlson
Inventor
Richard P. White
Foree Bain + Cook
Attys.

UNITED STATES PATENT OFFICE.

RICHARD P. WHITE, OF CHICAGO, ILLINOIS.

BAIL-EAR FOR VESSELS.

1,285,860.　　　　　Specification of Letters Patent.　　Patented Nov. 26, 1918.

Application filed March 18, 1918.　Serial No. 222,994.

*To all whom it may concern:*

Be it known that I, RICHARD P. WHITE, a citizen of the United States, residing at Chicago, in the county of Cook and State of Illinois, have invented certain new and useful Improvements in Bail-Ears for Vessels, of which the following is a specification.

My invention relates to improvements in bail ears for vessels.

One of the objects of my invention is to provide a bail ear for vessels, or other structures, and more particularly for vessels made of vitrifiable material, such as pottery ware, or the like, cheap to manufacture, which may easily and quickly be applied to the vessel and which tends, of itself, to adhere to the vessel by its inherent resiliency and which is more securely fixed in place by the effect of the weight of the vessel, when the latter is supported by the eye-engaging bail.

Other, further and more specific objects of my invention will become readily apparent, to persons skilled in the art, from a consideration of the following description, when taken in conjunction with the drawings, wherein:—

Figure 1 is an elevation of the vessel provided with a bail, with parts in section to show the bail ear.

Fig. 2 is an enlarged section showing the bail ear in section.

Fig. 3 is a similar view of a modified bail ear.

Fig. 4 is a perspective view of a bail ear; and

Fig. 5 shows the bail ear, with its attaching terminals yieldingly bent back temporarily, for insertion in the perforations provided in the side walls of the vessel.

In all the views the same reference characters are employed to indicate similar parts.

In the drawings 10 is a vessel, preferably of vitrifiable material, having a border bead 11 around its open end. A pair of small openings 12 and 13 are made in the side wall of the bead 11, and preferably on diametrically opposite sides of the vessel. It will be observed that these openings are made at an angle approximately 90 degrees from each other and 45 degrees each from a diametric central plane. These openings are to contain the respective ends of the bail ears.

The bail ear 14 is preferably made of a single piece of spring wire, having terminal ends 15 and 16. Midway of the terminals 15 and 16 of the bail ears is an eye 17 formed of the same piece of wire from which the straight portions 19 and 20 extend tangentially in opposite directions. In this eye, the eye of the bail 18 is to engage.

The openings 12 and 13, made in the sides of the bead 11 of the vessel, are farther apart at the surface of the bead, where they emerge, than they are interiorly, as shown in Figs. 2 and 3. In applying the ear 14 I prefer to engage the eye 17 and the straight longitudinal extensions 19 and 20, of the ear, with a tool to spread the terminals 15 and 16 farther apart, so that they may be made to easily enter the openings 12 and 13 in the bead 11, as shown in Fig. 5. A tool, such as a pair of pliers, having two prongs 21 and 22, on one side may be brought into engagement with the parts 19 and 20 of the ear, and having another prong 23, on the other side, which enters the eye 17 of the ear, so that when pressure is applied to bring the prongs 21 to 23 inclusive, in the alinement, as shown in Fig. 5, the terminals 15 and 16 will be temporarily moved farther apart against the resiliency of the eye 17 and the straight portions 19 and 20 will be moved at a greater angle than they occupy in the other figures. The loop or eye 17, being of resilient material, will permit the parts to be temporarily moved back to the positions shown in Fig. 5, without difficulty, so that when the ends 15 and 16 are brought in register with the ends of the openings 12 and 13 and the ear is released, the eye will automatically move itself into the positions shown in Figs. 2 and 3, with respect to the bead 11, thereby exerting an inherent resilient tension that moves the terminals 15 and 16 into the openings 12 and 13, respectively, and holds the parts in place. After the ear terminals have been inserted, as described, they will remain in position.

If the eye 17, of the ear 14, is made angularly, and placed with two corners in a vertical plane, as shown in Fig. 3, the bail 18 will tend to be thereby forced closer up to the edge of the bead 11, by making the pull direct on the vertical part 20 and the terminal end 16, thereby tending more forcibly to hold the bail in its position within the openings in the bead and without interfering with the resilient operation of the device, in any respect.

While I have shown my invention applied to the exterior surface of a vessel made of vitreous material, it will be manifest, to persons skilled in the art, that it is not an essential feature of the invention, as it may be applied to other vessels or structures made of different materials, without departure from the spirit of the invention and within the scope of the appended claim.

Having described my invention, what I claim is:—

In combination with a vessel having two pairs of spaced apart, inwardly-converging, bail-receiving openings in vertical alinement, said pairs being disposed in its side walls; a bail ear, providing an eye, having its end tangentially extending in opposite directions, each crossing the axis of the eye, and acutely bent toward each other at substantially the same angle with respect to the wall of the vessel as said openings, one said bail ear in each pair of openings and a bail engaging both ears.

In testimony whereof I hereunto set my hand.

RICHARD P. WHITE.

Copies of this patent may be obtained for five cents each, by addressing the "Commissioner of Patents, Washington, D. C."